Nov. 13, 1956  A. G. F. WALLGREN  2,770,509
DOUBLE ROW ROLLER BEARING
Filed Nov. 25, 1952
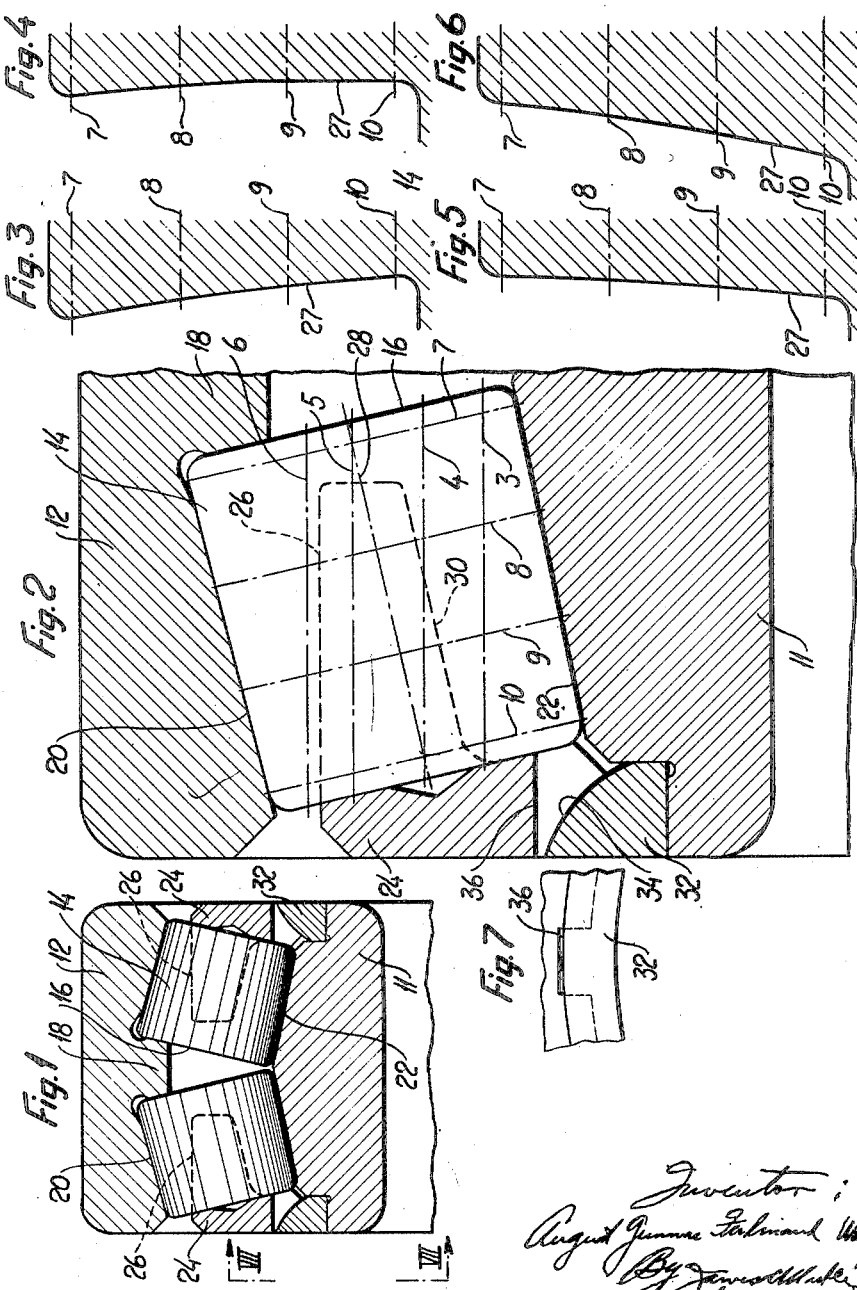

United States Patent Office 2,770,509
Patented Nov. 13, 1956

2,770,509

DOUBLE ROW ROLLER BEARING

August Gunnar Ferdinand Wallgren, Goteborg, Sweden

Application November 25, 1952, Serial No. 322,470

Claims priority, application Sweden November 28, 1951

2 Claims. (Cl. 308—214)

My invention relates to a double row roller bearing of the kind comprising an outer and an inner bearing member, rollers disposed therebetween, said rollers being axially fixed in both directions by means of surfaces on said bearing members. The rollers in each row are maintained in the desired peripheral position by means of retainer provided with separating members arranged between the rollers and united by an annular retainer member. Bearings of this kind are known in prior art, wherein the separating members between the rollers are designed with a portion in the interior of the bearing of a width greater than that of a portion located nearer to the outer face of the bearing, viewed in the axial direction. The retainer while determinating the mutual peripheral position of the rollers, is retained by said rollers so as to be prevented from being retracted from the bearing in the axial direction except by the application of force.

One object of my invention is to provide a modified construction of the roller retainer to be used in bearings of small dimensions or designed to operate under specific conditions. By reducing the diameter of the rollers the difference between the width of the portion of the separating members in the interior of the bearing and that of their portion located near the outer face of the rollers is diminished. Since further a certain play always must exist between the separating members and the rollers, the displaceability of the retainer in the axial direction becomes greater in a number of cases than is desirable.

On the other hand, it is known to construct the retainer with a one-sided retainer member and separating members directly insertable between the rollers in the axial direction, said retainer being prevented from retraction out of the bearing by the retainer member being locked relative to one of the bearing members by means of a holding ring secured to said ring.

In operation of the bearing the rollers drive the retainer with a force acting on the separating members and thus being located outside the retainer member. The retainer can be centered partly on the rollers and partly on the above-mentioned holding ring with a suitable play which in the latter respect should be slight, a correspondingly wider play being provided between the rollers and the separating members. Since the axial extent of the retainer member is small in proportion to the radius with which the driving force is acting, there is a risk of the centering face of the retainer member taking an inclined position relative to and thus being wedged up on the bearing member. It is the main feature of my invention to provide sliding surfaces between the holding ring and the retainer member of such configuration that the latter is prevented from becoming wedged up when brought into an inclined position because of the driving force emanating from the rollers and acting upon the separating members.

Further objects and advantages of the invention will be apparent from the following description considered in connection with the accompanying drawing, which forms a part of this specification, and of which:

Fig. 1 is an axial sectional view of a portion of a double row roller bearing constructed according to the invention.

Fig. 2 shows a portion of the bearing in the same section as in Fig. 1 but to a larger scale.

Figs. 3 to 6 illustrate the configuration of the clearances between the rollers represented by cylindrical sections taken through the generating lines 3 to 6 of Fig. 2.

Fig. 7 is a front view of a portion of the bearing seen in the direction of the arrows VII—VII of Fig. 1.

Referring to the drawings, 11 designates the inner ring of the bearing and 12 the outer ring thereof, between which are inserted two rows of preferably conical rollers 14. These rollers abut with their inner end surfaces 16, which are preferably of a slightly convex spherical shape in known manner, against a central annular flange 18 of the outer ring 12. The latter is provided with two roller ways or bearing races 20 of a conical or approximately conical shape, one for each row of rollers, the diameter of which increases in a direction toward the centre of the outer ring. Likewise the inner ring 11 is provided with two conical or approximately conical roller ways or bearing races 22, one for each row of rollers, the diameter of which increases in a direction toward the centre of the ring. The races 20, 22 for one row of rollers converge, the same as the conical surfaces of the rollers, so as to form a portion of the mantle surface of cones having their apices meeting at a common point on the axis of the bearing, which point is located on the same side relative to the centre of the bearing as the row of rollers under consideration. The position of the rollers 14 is axially fixed in both directions by reason of such formation of the races and by the presence of the central guide flange 18. When introducing the rollers into the bearing the inner ring is arranged eccentrically in the outer ring which at the same time is subjected to an elastic deformation.

Each row of rollers has a retainer comprising a retainer ring 24 and separating members or claws 26 projecting between the rollers and suitably made integral with said ring. The contour which said separating members must have in order to have their lateral surface to fit to the adjacent rollers will be seen from the Figs. 3 to 6 constituting sections taken through the mantle surfaces of cylinders the axis of which coincide with that of the bearing and the radii of which are of varying length in correspondence with the generating lines 3 to 6 of Fig. 2. The Figs. 3 to 6 illustrate a portion 27 of the mantle surface of the roller and a portion of the space to adjacent roller, said space being presented as a sectioned surface corresponding to the shape which the separating member must be given in order to fit to the mantle surface of the roller. The lines 7, 8, 9, 10 appearing in said figures represent sections taken vertically to the centre line 28 of the roller in accordance with the lines designated by the same numerals in Fig. 2. As will be clear therefrom, the space intermediate two rollers 14 according to the cylindrical section 3 is reduced axially in the direction from the interior of the bearing and outward toward the retainer ring 24. In the cylindrical section 4 the space intermediate the rollers is still larger at the interior portions of the rollers, but of approximately the same width over their outer half portions. As is evident from the Figs. 5 and 6 said relation is now reversed, the space intermediate the rollers thus when following the lines 5 and 6, increasing axially in the direction from the interior of the bearing toward the retainer ring 24. In response hereto the separating members 26 are located spaced so much from the axis as to be insertable by an axial displacement relative the rollers and at the same time ensuring the required spacing between the rollers. The separating members thus do not need to project inwardly toward the axis more than is determined by the configuration line 30. In order to ensure the separating members to operate correctly it is of importance that they have a relatively great radial extent. For this reason the separating members 26 are located for their major part radially outside the rolling axes 28.

The position of the retainer within the bearing is maintained by a holder ring 32 rigidly secured to the inner ring 11 by means of shrinking thereon or other known means. This holder ring is made from steel, the retainer ring or its surface abutting against said holder ring consisting of some other material such as brass, artificial resin or the like. In the embodiment shown in the drawings the holder ring 32 is provided with a sliding surface 34 having at least an approximately spherical configuration so as to reduce the spacing of the surface from the axis in the axial direction from the outer face of the bearing toward its interior. The centre of the radius determining the curvature of the surface when having a spherical configuration is located on or near the centre line of the bearing. Co-operating with the sliding surface 34 is a sliding surface of a corresponding shape provided on the retainer ring 24. In other words, the sliding surfaces are shaped so as to permit the retainer ring to take an inclined position relative the holder ring as a consequence of the driving force emanating from the rollers and acting on the separating members 26 without any danger of being wedged up.

One of the rings, either the retainer ring 24 or the holder ring 32, perferably the first-mentioned, is provided with circumferentially spaced lubricating grooves 36 preferably located in the surface of the retainer ring sliding against the holder ring. Said lubricating grooves can be given a relatively large peripheral extent thereby reducing the extent of the sliding surface and thus to a corresponding degree reducing the frictional losses which are relatively great when the lubricating means is grease. By providing the lubricating grooves in the spherical sliding surfaces the centrifugal force is made use of for ensuring perfect lubrication of the bearing. The grooves 36 may be of equal width, but from the point of technical production it is more advantageous to have their bases extending in parallel with the axis of the bearing as is shown in the figures.

My invention may be applied to double row roller bearings having spherical roller ways or bearing races. A loose guide flange having a sufficient radial extent can be disposed between the rollers against the spherical race of the outer ring, while the guide flange on the inner ring is eliminated. This construction permits the length of the roller to be increased, and the whole construction is rendered possible by locating the front portion of the retainer outside the rows of rollers instead of arranging them between said rows as has been done in the prior art. In some cases the invention is also applicable to double row ball bearings. If the sliding surface 34 is given a conical configuration the deviation from the purely spherical configuration will be very small.

While one more or less specific embodiment of the invention has been shown, it is to be understood that this is for purpose of illustration only, and the invention is not limited thereby, but its scope is to be determined by the appended claims.

What I claim is:

1. A double row roller bearing comprising inner and outer bearing members and rollers disposed therebetween, said members having surfaces for axially fixing the rollers in both directions between the members, a retainer comprising an annular retainer portion and a plurality of separating portions projecting between the rollers from said annular portion to maintain the rollers in each row in desired peripherally spaced position, a holder ring rigidly secured to one of said bearing members for preventing said retainer from displacement out of the bearing, said holder ring and said retainer having inclining and at least approximately spherically curved surfaces in sliding engagement for preventing the retainer from becoming wedged upon taking an inclined position relative to the holder ring.

2. A double row roller bearing comprising inner and outer bearing members and rollers disposed therebetween, said members having surfaces for axially fixing the rollers in both directions between the members, a retainer comprising an annular retainer portion and a plurality of separating portions projecting between the rollers from said annular portion to maintain the rollers in each row in desired peripherally spaced position, said separating portions being located radially from the axis of the bearing at a distance such that the major portions thereof lie radially outside of the longitudinal central axes of the rollers, a holder ring rigidly secured to one of said bearing members for preventing said retainer from displacement out of the bearing, said holder ring and said retainer having inclining and at least approximately spherically curved surfaces in sliding engagement for preventing the retainer from becoming wedged upon taking an inclined position relative to the holder ring.

References Cited in the file of this patent

UNITED STATES PATENTS

| | | |
|---|---|---|
| 1,914,548 | Wingquist | June 20, 1933 |
| 1,941,460 | Boden | Jan. 2, 1934 |
| 1,982,896 | Ackerman | Dec. 4, 1934 |
| 2,089,048 | Bachman | Aug. 3, 1937 |
| 2,125,648 | Palmgren | Aug. 2, 1938 |
| 2,435,839 | McNicoll | Feb. 10, 1948 |